US008694750B2

(12) United States Patent
Vyshetsky et al.

(10) Patent No.: US 8,694,750 B2
(45) Date of Patent: Apr. 8, 2014

(54) METHOD AND SYSTEM FOR DATA STRUCTURE MANAGEMENT

(75) Inventors: Dmitry Vyshetsky, Cupertino, CA (US); Paul Gyugyi, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 918 days.

(21) Appl. No.: 12/339,664

(22) Filed: Dec. 19, 2008

(65) Prior Publication Data

US 2010/0161876 A1 Jun. 24, 2010

(51) Int. Cl.
*G06F 12/00* (2006.01)

(52) U.S. Cl.
USPC ............ 711/170; 711/1; 711/5; 711/103; 711/137; 711/202; 711/221

(58) Field of Classification Search
USPC ............ 711/1, 5, 103, 137, 170, 202, 221
See application file for complete search history.

(56) References Cited

U.S. PATENT DOCUMENTS

| 4,360,916 | A | 11/1982 | Kustedjo et al. |
|---|---|---|---|
| 5,343,481 | A | 8/1994 | Kraft |
| 5,533,035 | A | 7/1996 | Saxena et al. |
| 5,603,001 | A | 2/1997 | Sukegawa et al. |
| 5,734,926 | A | 3/1998 | Feeley et al. |
| 5,787,279 | A | 7/1998 | Rigoutsos |
| 5,878,279 | A | 3/1999 | Athenes |
| 6,000,006 | A | 12/1999 | Bruce et al. |
| 6,222,144 | B1 | 4/2001 | Nishikawa |
| 6,636,940 | B1 | 10/2003 | Hodges |
| 6,760,743 | B1 | 7/2004 | Heddes et al. |
| 6,772,276 | B2 | 8/2004 | Dover |
| 6,985,977 | B2 | 1/2006 | Vrancic |
| 7,100,103 | B2 | 8/2006 | Mizrachi et al. |
| 7,237,016 | B1 | 6/2007 | Schober |
| 7,392,330 | B2 | 6/2008 | Weatherspoon |
| 7,457,897 | B1 | 11/2008 | Lee et al. |
| 7,689,998 | B1 | 3/2010 | Chrysanthakopoulos |
| 7,761,636 | B2 | 7/2010 | Mott et al. |
| 7,877,254 | B2 | 1/2011 | Luan et al. |
| 7,877,524 | B1 | 1/2011 | Annem et al. |
| 8,108,590 | B2 | 1/2012 | Chow et al. |

(Continued)

FOREIGN PATENT DOCUMENTS

| EP | 0502211 | 9/1992 |
|---|---|---|
| EP | 1271332 A2 | 1/2003 |

(Continued)

OTHER PUBLICATIONS

8273A High Performance Programmable DMA Controller' datasheet by Intel, Oct. 1989.

(Continued)

*Primary Examiner* — Gurtej Bansal

(57) ABSTRACT

Embodiments of the present invention are directed to a method and system for allowing data structures to be moved between storage locations of varying performance and cost without changing the application firmware. In one embodiment, rather than application firmware directly accessing memory, the application firmware requests a data structure by parameters, to which the implementation returns a pointer. The parameters can be, for example, the logical block address of a data sector, and the data structure can be mapping and associated information of that logical block address (LBA) to a location in the flash device.

21 Claims, 5 Drawing Sheets

Exemplary Process 300

(56) References Cited

U.S. PATENT DOCUMENTS

| | | | |
|---|---|---|---|
| 2002/0078270 A1 | 6/2002 | Hofstee et al. | |
| 2002/0161941 A1 | 10/2002 | Chue et al. | |
| 2003/0172147 A1 | 9/2003 | Chang et al. | |
| 2004/0044811 A1 | 3/2004 | Vrancic | |
| 2004/0186946 A1* | 9/2004 | Lee | 711/103 |
| 2005/0057973 A1 | 3/2005 | Khatami et al. | |
| 2005/0097183 A1 | 5/2005 | Westrelin | |
| 2005/0160200 A1 | 7/2005 | Saito | |
| 2005/0289253 A1 | 12/2005 | Edirisooriya et al. | |
| 2006/0004931 A1 | 1/2006 | Weatherspoon | |
| 2006/0136570 A1 | 6/2006 | Pandya | |
| 2006/0152981 A1 | 7/2006 | Ryu | |
| 2006/0236039 A1 | 10/2006 | Golander | |
| 2007/0073920 A1 | 3/2007 | Wu et al. | |
| 2008/0034153 A1* | 2/2008 | Lee et al. | 711/103 |
| 2008/0126684 A1 | 5/2008 | Wu et al. | |
| 2008/0140910 A1 | 6/2008 | Flynn et al. | |
| 2008/0250195 A1 | 10/2008 | Chow et al. | |
| 2008/0270681 A1 | 10/2008 | Van Acht et al. | |
| 2009/0002761 A1 | 1/2009 | La et al. | |
| 2009/0070520 A1 | 3/2009 | Mizushima | |
| 2009/0100307 A1 | 4/2009 | Lee | |
| 2009/0138654 A1 | 5/2009 | Sutardja | |
| 2009/0150605 A1 | 6/2009 | Flynn et al. | |
| 2009/0300318 A1* | 12/2009 | Allen et al. | 711/206 |
| 2010/0268864 A1 | 10/2010 | Ramiya Mothilal | |
| 2011/0055668 A1 | 3/2011 | Kim et al. | |

FOREIGN PATENT DOCUMENTS

| | | |
|---|---|---|
| EP | 1840722 A2 | 10/2007 |
| JP | 2004110438 A2 | 4/2004 |
| JP | 2007034581 A2 | 2/2007 |

OTHER PUBLICATIONS

Express Apps—PEX 8311 ' by PLX Technology, Jan. 2006.

Advanced Semiconductor Memories Architecture, Designs, and Applications, Ashok Sharma, IEEE Press, 2003, at 393-401.

Gupta, A. et al.: DFTL: A Flash Translation Layer Employing Demand—based Selective Caching of Page—level Address Mappings. In: Proceedings of the 14th international conference on Architectural support for programming languages and operating systems, ASPLOS '09, Mar. 7-11, 2009, Washington, DC, USA. pp. 229-240.

* cited by examiner

Exemplary Address Configuration 100

Exemplary Abstraction Diagram 200

Exemplary Process 300

Exemplary Process 400

Exemplary Process 500

METHOD AND SYSTEM FOR DATA STRUCTURE MANAGEMENT

BACKGROUND

Flash memory is an increasingly popular form of non-volatile computer memory. Flash memory is a specific type of EEPROM (Electrically Erasable Programmable Read-Only Memory) that can be electrically erased and reprogrammed. Flash memory is perhaps most commonly used as memory cards and Universal Serial bus (USB) flash drives for general storage and data transfer between computers and other digital products. As storage, flash memory offers considerable advantages over other traditional formats, such as hard disks and other EEPROMs. For example, Flash memory typically costs far less than byte-programmable EEPROM. Flash memory is also extremely durable, being able to withstand intense pressure, extremes of temperature, and even immersion in water. This combination of lower relative production costs and improved durability has enabled flash memory to become a dominant technology wherever a significant amount of non-volatile, solid state storage is desired, such as in mobile consumer electronics. Examples of popular flash memory applications include providing storage in personal data assistants (PDAs), laptop computers, digital audio players, digital cameras, mobile phones and video game consoles.

Unfortunately, flash memory has a distinct limitation, that of having a finite number of erase-write cycles. Typical commercially available flash products may withstand up to an approximate 100,000 write-erase cycles before storage reliability becomes compromised. Wear leveling is a known technique for partially offsetting this limitation by counting the writes and dynamically remapping blocks according to a distribution algorithm in some chip firmware or file system drivers in order to spread write operations between sectors in the flash memory. Other solutions (such as block management) are also used to manage the wearing effect on the flash memory sectors.

Naturally, the performance of the firmware executing the algorithm to perform wear leveling (or other data management schemes) is of great import to the continued use of flash memory. A typical application firmware for managing data in a flash memory may store a table mapping the logical block addresses to the actual physical location of a flash memory sector. The table may be stored in local memory (such as RAM) or, alternatively, in external or system memory (such as a hard drive). Local memory provides faster read and write times, but may be limited in size, much costlier, and is volatile in nature. Conversely, external memory typically provides larger, cheaper and persistent storage at slower read and write times. Alternatively, the parameters comprising a table entry may be condensed (e.g., into a 64 bit value) and offloaded in other hardware devices, which can be re-processed to extract the original data when necessary. Hardware offloading reduces the storage requirements for data management, but requires additional processing time to convert the compressed elements to express the original data.

However, as flash memory capacity continues to increase, the accompanying table may become significantly large and difficult to store and/or load in memory. Typical flash memory firmware applications are rarely scalable in terms of system resources, such as available RAM and in terms of data set size. For example, firmware applications may not be able to account for modifications to the amount of available memory or the addition or removal of a hardware device. In many instances, the flash memory firmware application may require significant modification to function properly. Furthermore, existing firmware applications typically do not leverage the benefits provided by the available storage types, often selecting one storage type to store the data table (or compressed data) to the exclusion of the other storage types. Naturally, this may result in inefficient or sub-optimal data management in the flash memory.

SUMMARY

Embodiments of the present invention are directed to a method and system for allowing data structures relating to flash memory to be moved between storage locations of varying performance and cost without changing the application firmware.

In one embodiment, rather than application firmware directly accessing memory for performing wear leveling, the application firmware requests a data structure by parameters, to which one embodiment returns a pointer. The parameters can be, for example, the logical block address of a flash memory data sector, and the data structure can be mapping and associated information of that logical block address (LBA) to a location in the flash device.

In the case where the data structure has been stored in high performance, yet high cost, local RAM, a reference is returned directly. In the case where the data structure has been stored in lower performance, yet lower cost, external memory, one embodiment first transfers the data structure into a temporary location in local memory, and then returns that reference.

In the case where the data structure has not been stored, but can be created by querying existing elements in the flash system, one embodiment gathers the necessary data and creates a temporary data structure in local memory and then returns that reference.

In one embodiment, upon receiving a request for a data structure, temporary data structures may be speculatively prepared in anticipation of subsequent requests having similar or associated parameters.

In one embodiment, data structures may be moved from one storage type to another, or even discarded if a data structure could be subsequently reconstructed, in order to optimize performance.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
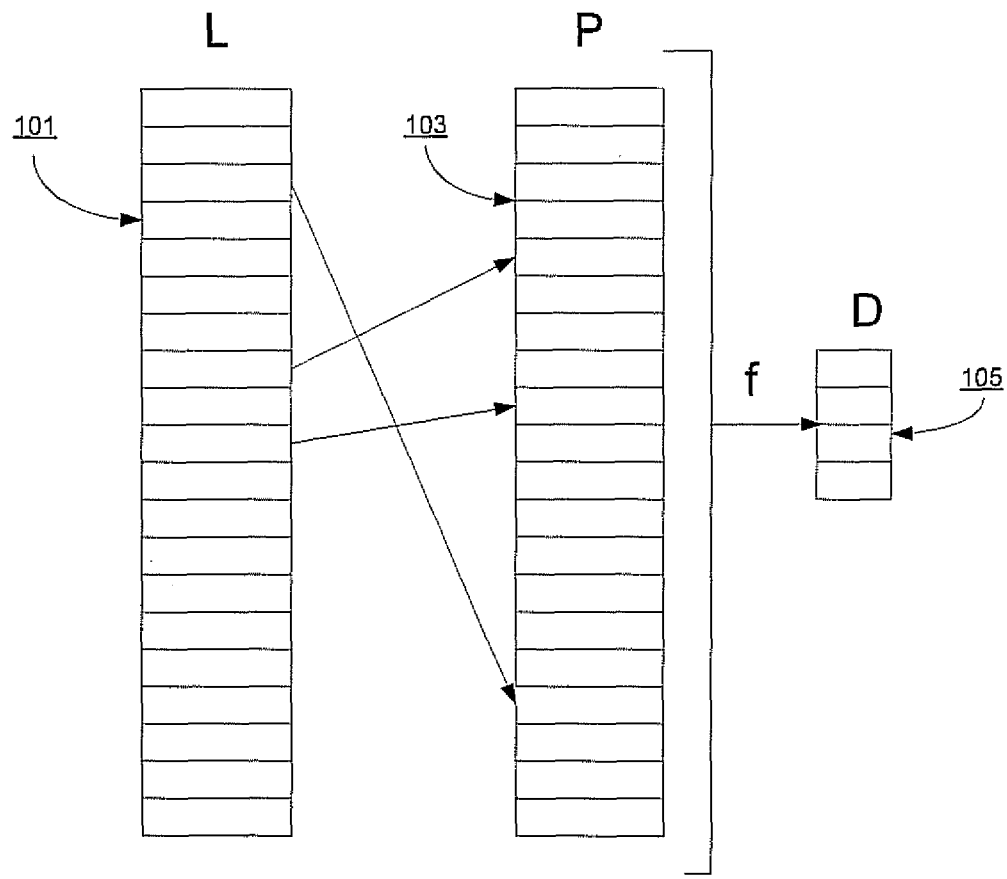
FIG. 1 depicts a block diagram of an exemplary mapping configuration of a plurality of addresses in a flash memory, in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in a figure herein (e.g., FIGS. 3-5) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Address Configuration

With respect to FIG. 1, a block diagram of an exemplary mapping configuration 100 of a plurality of addresses in a flash memory is depicted, in accordance with embodiments of the present invention. Configuration 100 may, for example, comprise a depiction of an exemplary mapping, as performed in various embodiments described below (e.g., step 303 of the process 300, step 401 of the process 400 and step 503 of the process 500).

In a typical arrangement, configuration 100 maps a plurality of logical block addresses (represented as logical address array 101) to the corresponding plurality of physical locations (represented as physical address array 103) in a flash memory component. In a typical flash device, the logical address of information stored in a flash memory component may not correspond to the actual physical location in the flash memory. For example, logical addresses may conform to a sequential indexing. However, the physical addresses corresponding to the logical block addresses may not conform to the sequence. Techniques such as wear leveling, which distribute writes evenly through data sectors of the flash memory, only further this dissonance. This incongruence is depicted in FIG. 1.

As shown, a cell of array 101 may correspond (correspondence represented by a directed arrow) to a cell in array 103 which may not conform to the relative position of the cell in array 101. Accessing a physical location may require referencing a plurality of parameters, such as the chip enable, logical unit number (LUN), page, offset, (and other parameters) which may in turn be extracted from a physical address. Typically, a logical block address is mapped to a corresponding physical address, after which the physical address may be converted via a function (e.g., function "f") into a plurality of addressing elements (parameters) which may be used to directly access the physical location wherein the desired block of data is stored. In one embodiment, the elements comprised in a physical address for a data sector may be extracted to form a data structure "D" (e.g., array 105), which can be stored in memory (e.g., local or external) or cache.

In one embodiment, when firmware for the flash memory component receives a request (e.g., from an operating system) for data stored in the flash memory component, a data structure is retrieved for the firmware by an underlying software interface. For example, according to one embodiment, rather than the firmware directly accessing the physical addresses of flash memory device to determine the physical address corresponding to a desired block of data, and subsequently converting the physical address to the plurality of addressing elements, the firmware is instead provided the data structure (e.g., data structure D) containing the addressing parameters. In further embodiments, the converting function f converting the addressing parameters (e.g., the parameters stored in data structure D) is specific to the current configuration of the system. For example, the function f may be modified to correspond to the physical structure of the flash component, and/or the configuration of system resources.

In further embodiments, the data structure is derived and delivered to the firmware by an underlying software interface interposed between the firmware and the flash memory. The inclusion of a layer (e.g., the software interface) interposed between the firmware application and the flash memory allows a system design wherein knowledge of the exact layout of the flash memory or system resources is not required by the firmware application. Accordingly, data management may persist as system resources are interchanged without requiring updated firmware.

Software Abstraction Layer Diagram

Figure 2:
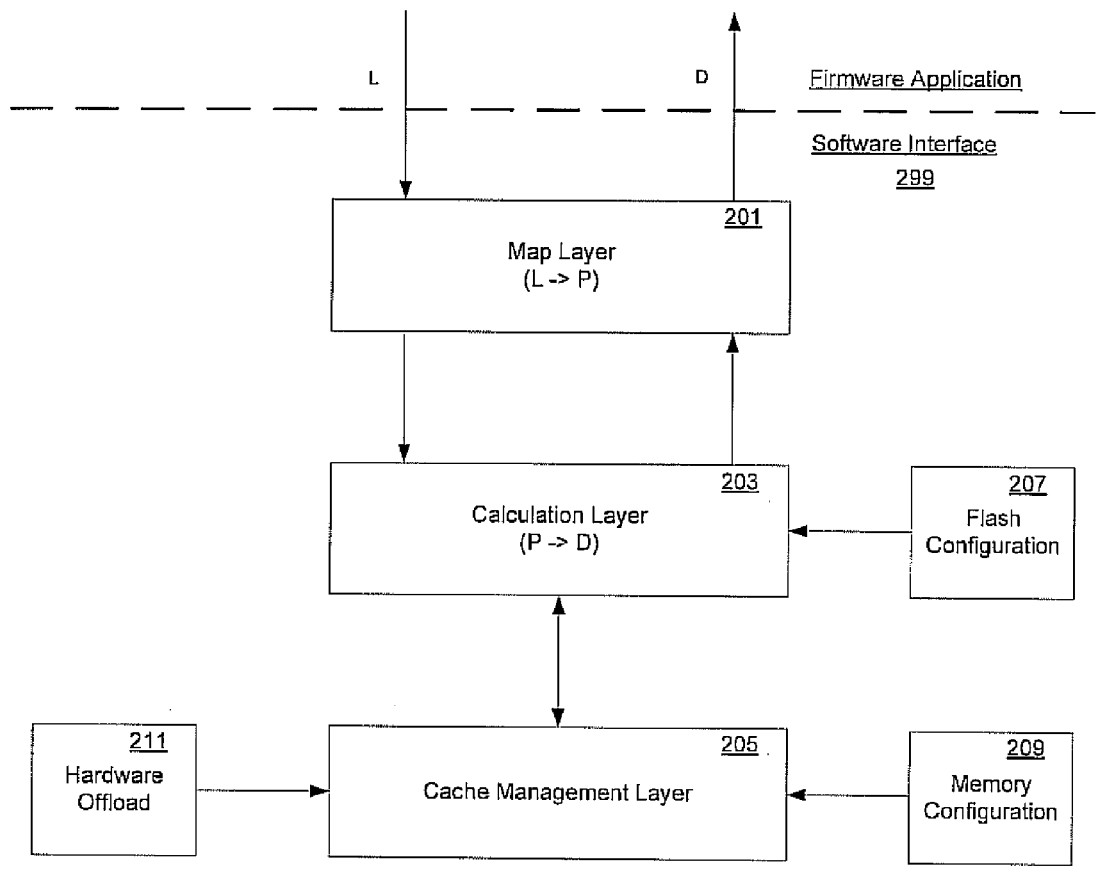
FIG. 2 depicts a software abstraction diagram of an exemplary software layer configuration, in accordance with embodiments of the present invention.

With respect to FIG. 2, an exemplary software layer diagram 200 is depicted, in accordance with embodiments of the present invention. Configuration 200 may, for example, comprise a depiction of the process performed by a software interface interposed between a flash memory component and the firmware application of the flash memory component.

As presented in FIG. 2, a firmware application operating on a flash memory component may receive a request for the logical block address L for data stored in the flash memory component. The request may be received from, for example, an operating system of a computing device communicatively coupled to the flash memory component. In one embodiment, the request may comprise the logical block address corresponding to a data sector in the flash memory component. The logical block address L is transmitted to a software interface 599, where the logical block address L is received in a map layer 501. The logical block address L is then mapped to a corresponding physical address P in the flash memory component. Mapping may be performed by, for example, a calculation which derives a physical address P from the value of the logical block address L.

The physical address P is then transmitted to a calculation layer 503, where the physical address P is extracted to obtain a data structure (e.g., data structure D) containing the address elements (e.g., the chip enable, logical unit number (LUN), page, offset, and other parameters) used to index (and to identify) the specific block of data in the flash memory component corresponding to the physical address P. Extracting the physical address P may be performed by a function. In one embodiment, the converting function may be specific to the configuration of the resources in the system. For example, the converting function may reference the flash configuration 507 to determine the configuration of the flash memory in order to apply the correct function.

In one embodiment, the data structure D is pre-stored in the system memory. Calculation layer 503 may reference a cache management layer 505 to determine the location of the data structure D. Cache management layer 505 may reference memory configuration 509 to determine the location of data structure D in memory. In some embodiments, data structure D may not be stored in memory, but rather, may be condensed and distributed in hardware offload 511. Accordingly, cache management layer 505 may extract the condensed elements comprising data structure D. Once the data structure D is located, the data structure D is passed through the remaining layers of software interface 599 and into the firmware application.

In further embodiments, the firmware application may anticipate subsequent requests for logical block addresses sequentially following the requested logical block address L (e.g., L+1). Accordingly, the software interface may speculatively derive data structures corresponding to the subsequent requests anticipated. In one embodiment, the speculatively derived data structures may be stored in the cache of the flash memory component.

In still further embodiments, cache management layer 505 may load data structure D into the cache of a processor.

Exemplary Data Structure Management Process

Figure 3:
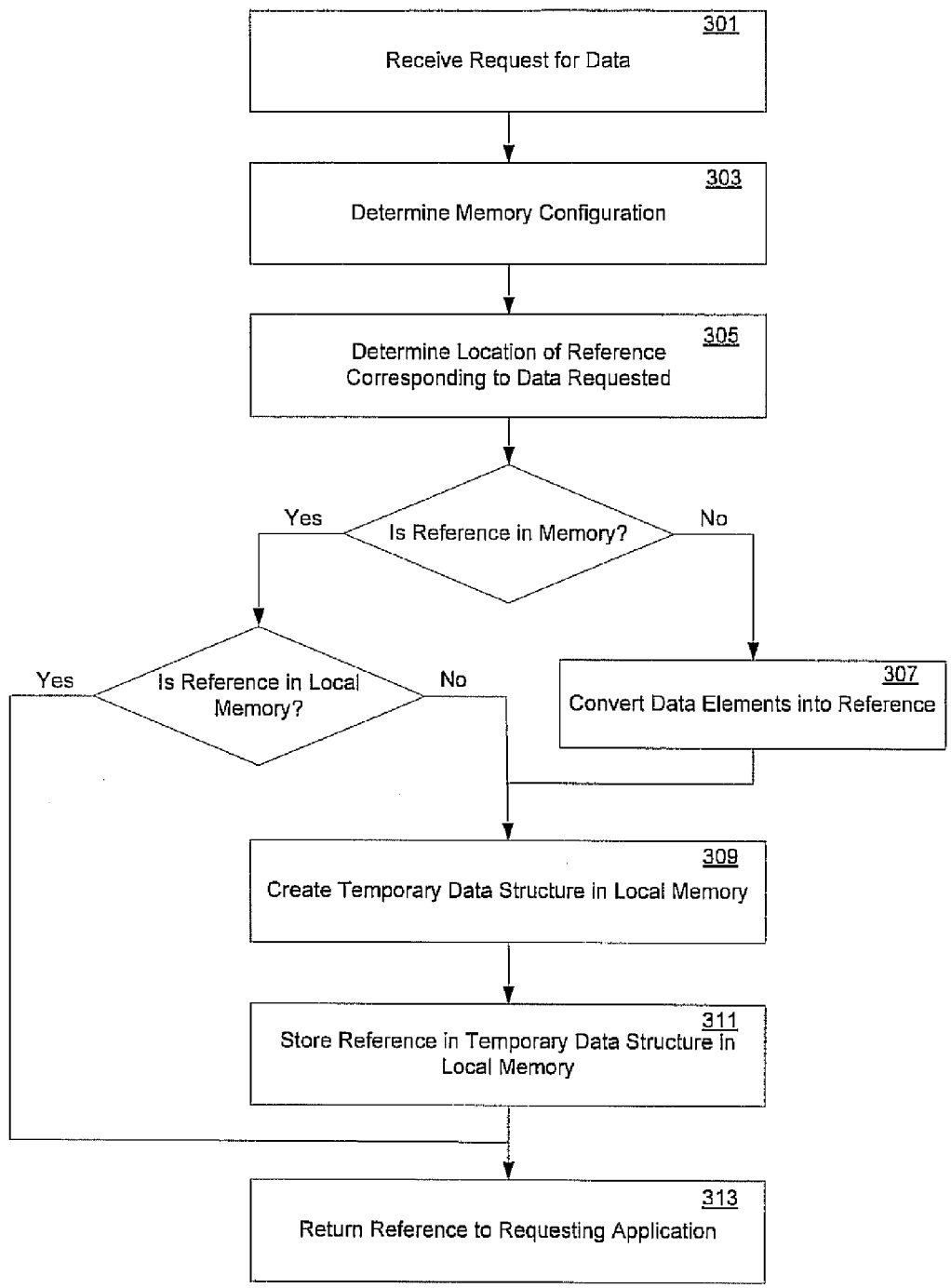
FIG. 3 depicts a flowchart of an exemplary process for data structure management in a storage device, in accordance with embodiments of the present invention.

With reference to FIG. 3, a flowchart of an exemplary process 300 for data structure management in a storage device is depicted, in accordance with various embodiments of the present invention. Process 300 may be performed by, for example, the firmware of a storage device.

At step 301 of FIG. 3, a request for data at a location in a storage device of a system is received. In one embodiment, the system may be any computing system, such as a personal computer or laptop computer, etc. The storage device may comprise, for example, a flash memory component. In one embodiment, the request may comprise the logical block address of a data sector in a flash memory component. The request may be sent from, for example, an operating system of a computing device. In some embodiments, the request is received by firmware executing in the flash memory component. In one embodiment, the request is transmitted from the firmware application to a software interface logically interposed between (e.g., abstract from) the firmware application and the flash memory component.

At step 303 of FIG. 3, the current configuration of the system's resources is determined. The current configuration of the system's resources may include, for example, the configuration of the flash memory component, the memory configuration and/or the configuration of the system's hardware offload. In some embodiments, the current configuration of a system's resources may be pre-determined and stored, wherein the step 303 may be omitted.

At step 305 of FIG. 3, the location of a reference corresponding to the data requested at step 301 is determined. In one example, the reference is implemented as a data structure comprising a plurality of elements which may be used to interface with the specific block of data in a flash memory. The plurality of elements may include, for example, the chip enable, logical unit number (LUN), page, offset, and other parameters used to index (and to identify) the specific block of data in the flash memory component. In alternate embodiments, the reference may comprise a condensed version of the indexing parameters. For example, the indexing parameters may be condensed into a single binary value (e.g., 64 bit), which can be extrapolated into a set of elements comprising a data structure via a pre-defined conversion process.

In one embodiment, the location of the reference may be determined from a requested logical block address. In further embodiments, the location of the reference in memory may be determined by mapping a logical block address to a physical address. Thereafter, the physical address may be translated also in the software interface to a corresponding data structure, and the location the data structure is stored (if applicable).

In some embodiments, the location of the reference may be determined to be in memory (e.g., local memory or external memory). If the location of the reference is determined to be in local memory, such as local RAM, the reference (e.g., a data structure comprising the index elements) may be returned to the requesting firmware application directly (step 311). Subsequently, the firmware application may interface with the flash memory device at the specified physical address referenced in the data structure.

Alternatively, the location of the reference may be determined to be in external memory (e.g., a hard disk). In one embodiment, when a data structure is stored in external memory, a temporary data structure may be created in local memory (step 307), and the data structure in the external memory is transferred to the temporary data structure in the local memory (step 309). Thereafter, the reference is returned to the requesting firmware application at step 311 from the location in local memory.

In still further embodiments, a formed data structure may not be stored, but may be extrapolated from existing condensed elements in one or more other hardware devices in the underlying system. For example, network interface cards (NICs) often are capable of performing functions similar to those of a microprocessor (such as processing, caching and storage). Other components, such as microprocessors may also be suitable for performing hardware offloading. Accordingly, the condensed elements are gathered, processed and converted to extract the addressing elements at step 305. In further embodiment, a temporary data structure is created in local memory (step 307) to store the extracted elements. The converted data structure is then transferred, at step 309, to the temporary data structure. Subsequently, the reference is returned to the requesting firmware application at step 311 from the location in local memory.

In some embodiments, the software interface may also provide pre-fetching and caching functionality. For example, the software interface may anticipate subsequent requests which sequentially follow the logically requested data sector. Accordingly, references (e.g., data structures) may be pre-derived prior to receiving an actual request for the reference. In further embodiments, the data structures may be stored in local memory (for faster read times) if previously stored elsewhere (e.g., hardware offload, external memory). In still further embodiments, the data structures may be pre-loaded into the cache of a processor.

In one embodiment, the derivation of the address elements described in process 300 of FIG. 3 is performed transparently to, and abstract from, the firmware application in an interposing software interface layer. By abstracting the process, scaling may be performed in the interposing software interface to correspond to adjustments in hardware components (e.g., memory sizes) or other modifications to the system (e.g., additional software or firmware layers) without requiring complex adjustments to the firmware application.

Data Structure Management

Figure 4:
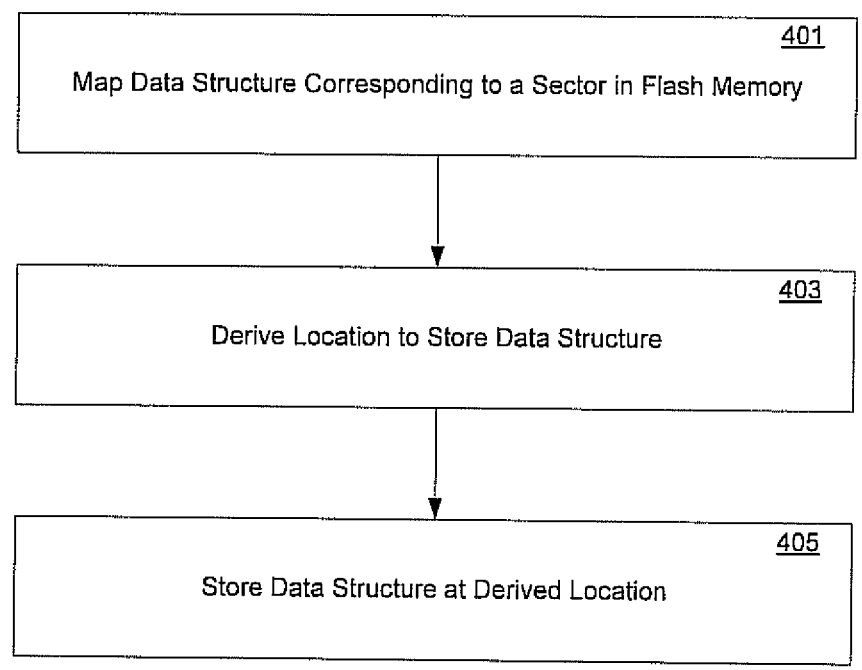
FIG. 4 depicts a flowchart for an exemplary process for managing the storage of data structures in a storage device, in accordance with embodiments of the present invention.

With reference to FIG. 4, a flowchart of an exemplary process 400 for managing the storage of data structures in a storage device is depicted, in accordance with various embodiments of the present invention. Process 400 may be performed by, for example, by an operating system working in conjunction with firmware of a storage device.

At step 401 of FIG. 4, a logical address corresponding to a sector in a flash memory device is mapped to the physical address of that sector. In one example, a logical address may be mapped to a physical address according to a first function.

At step 403 of FIG. 4, the physical address mapped to the logical address in step 401 is converted into a data structure comprising a plurality of data elements. The physical address may be converted, e.g., calculated, into the data structure according to a second function. The plurality of data elements correspond to the parameters required to interface with the data block at the physical address and may include, for example, the chip enable, LUN, page and offset of the data sector.

At step 405 of FIG. 4, the data structure calculated at step 403 is stored in a derived location. In one embodiment, deriving the location may be performed by applying a heuristic at the time the data structure is converted. In further embodiments, the heuristic may take into consideration the hardware configuration (e.g., flash memory device configuration, local and external memory configuration) to derive the location to store the data structure.

In further embodiments, storing the data structure also includes optimizing the performance of a data read or write to the flash memory by managing the location of the data structure. For example, a data structure stored in slower external memory may be transferred to local memory or a processor's cache temporarily for a request for a data read or write to the flash memory.

Request Management

Figure 5:
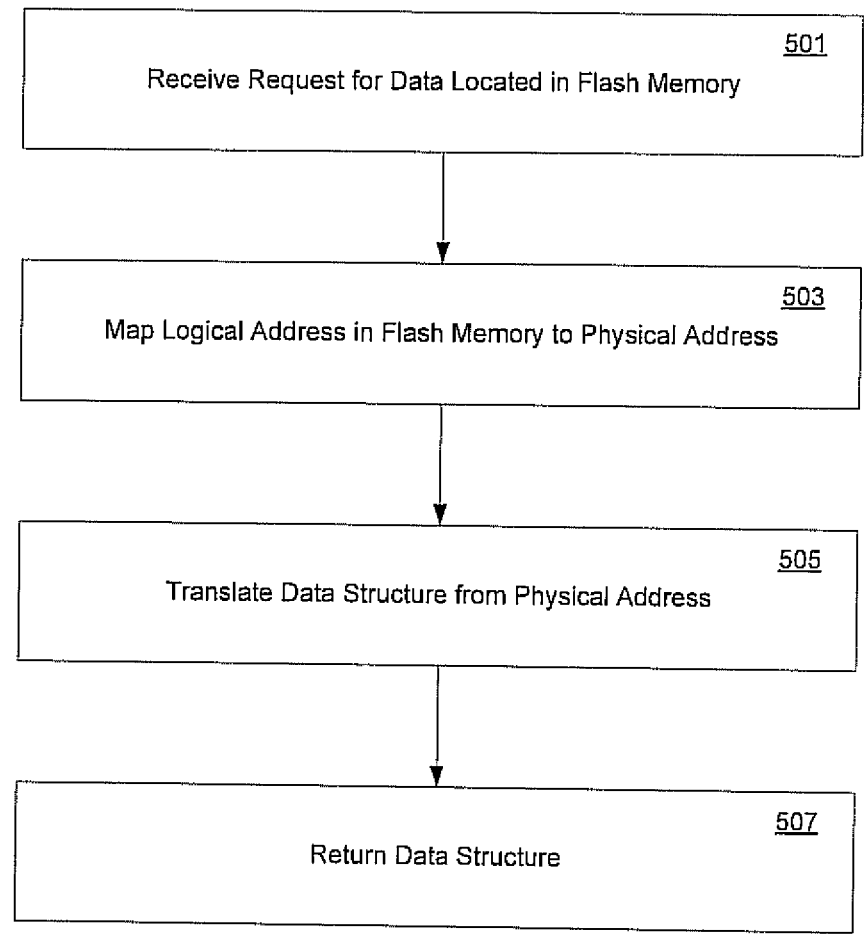
FIG. 5 depicts a flowchart of an exemplary process for managing data structure requests in a system, in accordance with embodiments of the present invention.

With reference to FIG. 5, a flowchart of an exemplary process for managing data structure requests in a system is depicted, in accordance with embodiments of the present invention. Process 500 may be performed for example, in a computing system comprising a flash memory device and a microcontroller.

At step 501 of FIG. 5, a request is received in a firmware application executing on the flash memory device for data located at a logical address in the flash memory device. In one embodiment, the request may be issued from the operating system of the computing system. In further embodiments, the hardware device (e.g., a microcontroller) may request the data from the flash memory device.

At step 503 of FIG. 5, the logical address received by the firmware application is mapped to a physical address. In one embodiment, the mapping is performed in a software interface logically interposed between the firmware application and the flash memory. In some embodiments, mapping may be performed according to a first pre-defined function.

At step 505 of FIG. 5, the physical address mapped at step is translated into a plurality of indexing elements corresponding to the location of the data requested at step 501 in the flash memory device. In one embodiment, translation is performed according to a second pre-defined function. In some embodiments, the translation is also performed in a software interface logically interposed between the firmware application and the flash memory.

In further embodiments, the plurality of indexing elements is aggregated into a data structure.

Finally, at step 507 of FIG. 5, the data structure (or plurality of indexing elements) is transmitted to the requesting hardware device or operating system through the firmware application, thus maintaining a layer of abstraction between the firmware application and the flash memory.

While the following exemplary configurations are shown as incorporating specific, enumerated features and elements, it is understood that such depiction is exemplary. Accordingly, embodiments are well suited to applications involving different, additional, or fewer elements, features, or arrangements.

What is claimed is:

1. A method for managing data structures in a storage device of a system, said method comprising:
   receiving a request in a firmware application for data located in a storage device, said firmware application being executed in said storage device but not directly accessing said storage device;
   determining a current memory configuration of said system;
   determining a location of a reference data structure in a memory based on said current memory configuration, said reference data structure comprising a plurality of parameters corresponding to said data
   when said reference data structure does not yet exist,
      i) gathering a plurality of condensed data elements comprised in a plurality of hardware devices of said system, the plurality of condensed data elements comprising a plurality of addressing elements condensed into a binary value;
      ii) processing said plurality of condensed data elements to extract said plurality of addressing elements;
      iii) converting said plurality of addressing elements into a temporary data structure;
      iv) storing said temporary data structure in a local memory as said reference data structure; and
   returning said location of said reference data structure to said firmware application.

2. The method according to claim 1, wherein said storage device is a flash memory device.

3. The method according to claim 1, wherein said receiving said request comprises receiving a request for data stored at a logical block address in a sector of said storage device.

4. The method according to claim 1, wherein said memory is local memory and said location comprises a location of said reference data structure in said local memory.

5. The method according to claim 1, wherein said memory is an external memory and said location comprises a location of said reference data structure in said external memory.

6. The method according to claim 1, wherein said determining said location comprises transferring said reference data structure from a location in an external memory to a location in said local memory when said location of said reference data structure comprises a location in said external memory.

7. The method according to claim 1, wherein a data element from said plurality of data elements is stored in hardware offload.

8. The method according to claim 1, further comprising transferring a reference from a first location in a first memory type to a second location in a second memory type, wherein said transferring is performed prior to returning said location of said reference data structure.

9. The method according to claim 1, wherein said plurality of hardware devices comprises a network interface card (NIC).

10. The method according to claim 1, wherein said plurality of hardware devices comprises a microprocessor.

11. The method according to claim 1, further comprising:
pre-fetching a plurality of references corresponding to a plurality of speculative subsequent requests from said firmware application; and
storing said plurality of references in a cache.

12. The method according to claim 11, wherein said storing said plurality of references in a cache comprises transferring said plurality of references from a first plurality of locations in memory to a second plurality of locations in a cache in said memory.

13. The method according to claim 11, wherein said pre-fetching said plurality of references comprises:
anticipating a plurality of subsequent requests for data from said firmware application; and
determining a plurality of locations in said memory for a plurality of references corresponding to said plurality of subsequent requests.

14. The method according to claim 13, wherein said determining said plurality of locations in memory comprises:
referencing a plurality of data elements corresponding to said plurality of subsequent requests;
converting said plurality of data elements into a plurality of temporary data structures;
storing said plurality of temporary data structures in a plurality of locations in memory; and
returning said plurality of locations.

15. A method of managing the storage of data structures in a storage device, the method comprising:
mapping a logical address corresponding to a sector in a flash memory to a physical address of said flash memory;
converting said physical address to a data structure comprising a plurality of data elements;
storing said data structure in a derived location in a local memory when said data structure exists,
when said data structure does not yet exist,
i) gathering a plurality of condensed data elements comprised in a plurality of hardware devices coupled to said storage device, the plurality of condensed data elements comprising a plurality of addressing elements condensed into a binary value;
ii) processing said plurality of condensed data elements to extract said plurality of addressing elements;
iii) converting said plurality of addressing elements into a temporary data structure; and
iv) storing said temporary data structure as said data structure in said local memory.

16. The method according to claim 15 wherein said data structure comprises a plurality of parameters corresponding to said physical address of said data in said flash memory.

17. The method according to claim 15, wherein storing said data structure comprises managing storage of said data structure among a plurality of storage types.

18. The method according to claim 17, wherein said managing storage of said data structure comprises transferring said data structure from a location in said local memory to a location in a processor cache.

19. A system comprising a flash memory device, a plurality of storage components and a hardware device including a processor and a cache, the system comprising a plurality of program instructions, which when executed by the processor causes the system to implement a method of managing data structure requests in a system, said plurality of program instructions comprising:
instructions to map a logical address corresponding to a sector in a flash memory to a physical address of said flash memory;
converting said physical address to a data structure comprising a plurality of data elements;
instructions to store said data structure in a derived location in a local memory when said data structure exists,
when said data structure does not yet exist,
i) gathering a plurality of condensed data elements comprised in a plurality of hardware devices coupled to said storage device, the plurality of condensed data elements comprising a plurality of addressing elements condensed into a binary value;
ii) processing said plurality of condensed data elements to extract said plurality of addressing elements;
iii) converting said plurality of addressing elements into a temporary data structure; and
iv) storing said temporary data structure as said data structure in said local memory.

20. The system according to claim 19, said plurality of program instructions further comprising:
instructions to manage a plurality of data structures corresponding to a plurality of data sectors in said flash memory.

21. The system according to claim 20, wherein said instructions to manage a plurality of data structures comprises instructions to transfer said plurality of data structures to a location in said cache according to a heuristic to improve performance.

* * * * *